United States Patent
Kamada et al.

(10) Patent No.: US 11,772,615 B2
(45) Date of Patent: Oct. 3, 2023

(54) VEHICLE CONTROL SYSTEM

(71) Applicant: Toyota Jidosha Kabushiki Kaisha, Toyota (JP)

(72) Inventors: Hitoshi Kamada, Susono (JP); Kenichiro Aoki, Miyoshi (JP); Taiyo Uejima, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 257 days.

(21) Appl. No.: 16/659,009

(22) Filed: Oct. 21, 2019

(65) Prior Publication Data

US 2020/0130654 A1  Apr. 30, 2020

(30) Foreign Application Priority Data

Oct. 31, 2018 (JP) ................................ 2018-204979

(51) Int. Cl.
| | |
|---|---|
| *B60T 7/14* | (2006.01) |
| *B60W 10/18* | (2012.01) |
| *B60K 28/06* | (2006.01) |
| *B60W 40/09* | (2012.01) |
| *B60W 40/02* | (2006.01) |

(52) U.S. Cl.
CPC ................ *B60T 7/14* (2013.01); *B60K 28/06* (2013.01); *B60W 10/18* (2013.01); *B60W 40/02* (2013.01); *B60W 40/09* (2013.01); *B60W 2540/26* (2013.01); *B60W 2540/30* (2013.01)

(58) Field of Classification Search
CPC ........................... B60K 28/06; B60W 2540/26
See application file for complete search history.

(56) References Cited

U.S. PATENT DOCUMENTS

| | | | |
|---|---|---|---|
| 10,166,866 B2 | 1/2019 | Otake | |
| 10,220,825 B2 | 3/2019 | Otake et al. | |
| 10,239,537 B2 | 3/2019 | Otake | |
| 10,446,031 B2 * | 10/2019 | Agnew | .................... G08G 1/16 |
| 10,589,743 B2 | 3/2020 | Otake | |
| 11,021,156 B2 | 6/2021 | Uejima | |

(Continued)

FOREIGN PATENT DOCUMENTS

| | | |
|---|---|---|
| JP | 2003-118424 A | 4/2003 |
| JP | 2007-331652 A | 12/2007 |

(Continued)

*Primary Examiner* — Imran K Mustafa
(74) *Attorney, Agent, or Firm* — Dinsmore & Shohl LLP (57) ABSTRACT

A vehicle control system installed on a vehicle includes: a driver abnormality detection device configured to detect abnormality of a driver of the vehicle; a vehicle control device configured to execute vehicle stop control that stops the vehicle and abnormality notification processing that activates a notification device, when the abnormality of the driver is detected; and an information acquisition device configured to acquire driving environment information including at least one of surrounding situation information indicating a situation around the vehicle, vehicle state information indicating a state of the vehicle, and driving operation information indicating a driving operation by the driver. The vehicle control device determines, based on the driving environment information, whether to continue or terminate the abnormality notification processing after termination of the vehicle stop control.

6 Claims, 8 Drawing Sheets

(56) References Cited

U.S. PATENT DOCUMENTS

| | | | |
|---|---|---|---|
| 11,110,934 B2 | 9/2021 | Watanabe et al. | |
| 11,299,153 B2 | 4/2022 | Tanaka | |
| 2013/0018549 A1* | 1/2013 | Kobana | B60K 28/06 701/41 |
| 2016/0023666 A1* | 1/2016 | Lee | A61B 5/18 701/33.4 |
| 2016/0362113 A1* | 12/2016 | Takaso | G05D 1/0257 |
| 2017/0232973 A1 | 8/2017 | Otake | |
| 2020/0231181 A1* | 7/2020 | Miyahara | B60W 60/0051 |

FOREIGN PATENT DOCUMENTS

| | | |
|---|---|---|
| JP | 2017-144808 A | 8/2017 |
| JP | 2018-131202 A | 8/2018 |

\* cited by examiner

VEHICLE CONTROL SYSTEM

CROSS-REFERENCE TO RELATED APPLICATION

This application claims priority to Japanese Patent Application No. 2018-204979 filed on Oct. 31, 2018, the entire contents of which are incorporated by reference herein.

BACKGROUND

Technical Field

The present disclosure relates to a vehicle control system that controls a vehicle. In particular, the present disclosure relates to a vehicle control system that executes emergency control when detecting abnormality of a driver of a vehicle.

Background Art

Patent Literature 1 discloses a vehicle stop device that executes stop control that forcibly stops a vehicle. The vehicle stop device determines whether or not a driver is in a state to be able to normally drive the vehicle. When the driver is not in the state to be able to normally drive the vehicle, the vehicle stop device determines a stop location based on surrounding situation ahead of the vehicle and executes the stop control such that the vehicle stops at the stop location. Furthermore, the vehicle stop device notifies surroundings of the vehicle of abnormality by blinking hazard lights and ringing a horn.

Patent Literature 2 discloses a travel control device. When detecting decrease in awareness level of a driver, the travel control device executes vehicle stop control that automatically stops a vehicle. In the vehicle stop control, the travel control device makes the vehicle stop in a leftmost lane.

LIST OF RELATED ART

Patent Literature 1: Japanese Unexamined Patent Application Publication No. JP-2007-331657
Patent Literature 2: Japanese Unexamined Patent Application Publication No. JP-2003-118424

SUMMARY

When abnormality of a driver of a vehicle is detected, some embodiments execute not only vehicle stop control that stops the vehicle but also abnormality notification processing that notifies the outside of the abnormality of the driver. However, unnecessarily continuing the abnormality notification processing even after termination of the vehicle stop control may be annoying for an occupant in the vehicle or people around the vehicle. On the other hand, terminating the abnormality notification processing together with the termination of the vehicle stop control may not be desirable depending on the situation. The above-mentioned Patent Literatures do not disclose how to terminate the abnormality notification processing.

An object of the present disclosure is to provide a technique that relates to abnormality notification processing executed when abnormality of a driver of a vehicle is detected and can flexibly continue or terminate the abnormality notification processing depending on the situation.

A first aspect is directed to a vehicle control system installed on a vehicle.

The vehicle control system includes:

a driver abnormality detection device configured to detect abnormality of a driver of the vehicle;

a vehicle control device configured to execute vehicle stop control that stops the vehicle and abnormality notification processing that activates a notification device, when the abnormality of the driver is detected; and an information acquisition device configured to acquire driving environment information including at least one of surrounding situation information indicating a situation around the vehicle, vehicle state information indicating a state of the vehicle, and driving operation information indicating a driving operation by the driver.

The vehicle control device is further configured to determine, based on the driving, environment information, whether to continue or terminate the abnormality notification processing after termination of the vehicle stop control.

A second aspect further has the following feature in addition to the first aspect.

The driving environment information includes the driving operation information.

When the driving operation is performed by the driver during execution of the vehicle stop control, the vehicle control device terminates the vehicle stop control and determines whether to continue or terminate the abnormality notification processing according to a type of the driving operation.

A third aspect further has the following feature in addition to the second aspect.

When the driving operation is an acceleration operation, the vehicle control device terminates the abnormality notification processing.

A fourth aspect further has the following feature in addition to the second aspect.

When the driving operation is a braking operation, the vehicle control device continues the abnormality notification processing.

A fifth aspect further has the following feature in addition to the first aspect.

The driving environment information includes the surrounding situation information.

The vehicle control device is further configured to:

determine, based on the surrounding situation information, whether or not a first notification termination condition related to the situation around the vehicle is satisfied;

terminate the abnormality notification processing when the first notification termination condition is satisfied; and continue the abnormality notification processing when the first notification termination condition is not satisfied.

A sixth aspect further has the following feature in addition to the first aspect.

The driving environment information includes the vehicle state information.

The vehicle control device is further configured to:

determine, based on the vehicle state information, whether or not a second notification termination condition related to the state of the vehicle is satisfied;

terminate the abnormality notification processing when the second notification termination condition is satisfied; and continue the abnormality notification processing when the second notification termination condition is not satisfied.

A seventh aspect further has the following feature in addition to the first aspect.

The driving environment information includes the surrounding situation information, the vehicle state information, and the driving operation information.

A notification termination condition for terminating the abnormality notification processing includes:

a first notification termination condition related to the situation around the vehicle;

a second notification termination condition related to the state of the vehicle; and a third notification termination condition related to the driving operation by the driver.

The vehicle control device is further configured to:

determine, based on the driving environment information, whether or not the notification termination condition is satisfied;

continue the abnormality notification processing when at least one of the first notification termination condition, the second notification termination condition, and the third notification termination condition is not satisfied; and terminate the abnormality notification processing when all of the first notification termination condition, the second notification termination condition, and the third notification termination condition are satisfied.

An eighth aspect is directed to a vehicle control system installed on a vehicle.

The vehicle control system includes:

a memory device in which driver state information indicating a state of a driver of the vehicle and driving environment information indicating driving environment for the vehicle are stored;

a processor; and a notification device.

The driving environment information includes at least one of surrounding situation information indicating a situation around the vehicle, vehicle state information indicating a state of the vehicle, and driving operation information indicating a driving operation by the driver.

The processor is configured to:

detect abnormality of the driver based on the driver state information;

execute vehicle stop control that stops the vehicle and abnormality notification processing that activates the notification device, when the abnormality of the driver is detected; and determine, based on the driving environment information, whether to continue or terminate the abnormality notification processing after termination of the vehicle stop control.

According to the present disclosure, whether or not to continue the abnormality notification processing after the termination of the vehicle stop control is determined based on the driving environment information. The driving environment information includes at least one of the surrounding situation information indicating the situation around the vehicle, the vehicle state information indicating the state of the vehicle, and the driving operation information indicating the driving operation by the driver. Considering the driving environment information makes it possible to flexibly continue or terminate the abnormality notification processing depending on the situation. This contributes to improvement of convenience of the vehicle control system.

EMBODIMENTS

Embodiments of the present disclosure will be described below with reference to the attached drawings.

1. OUTLINE

Figure 1:
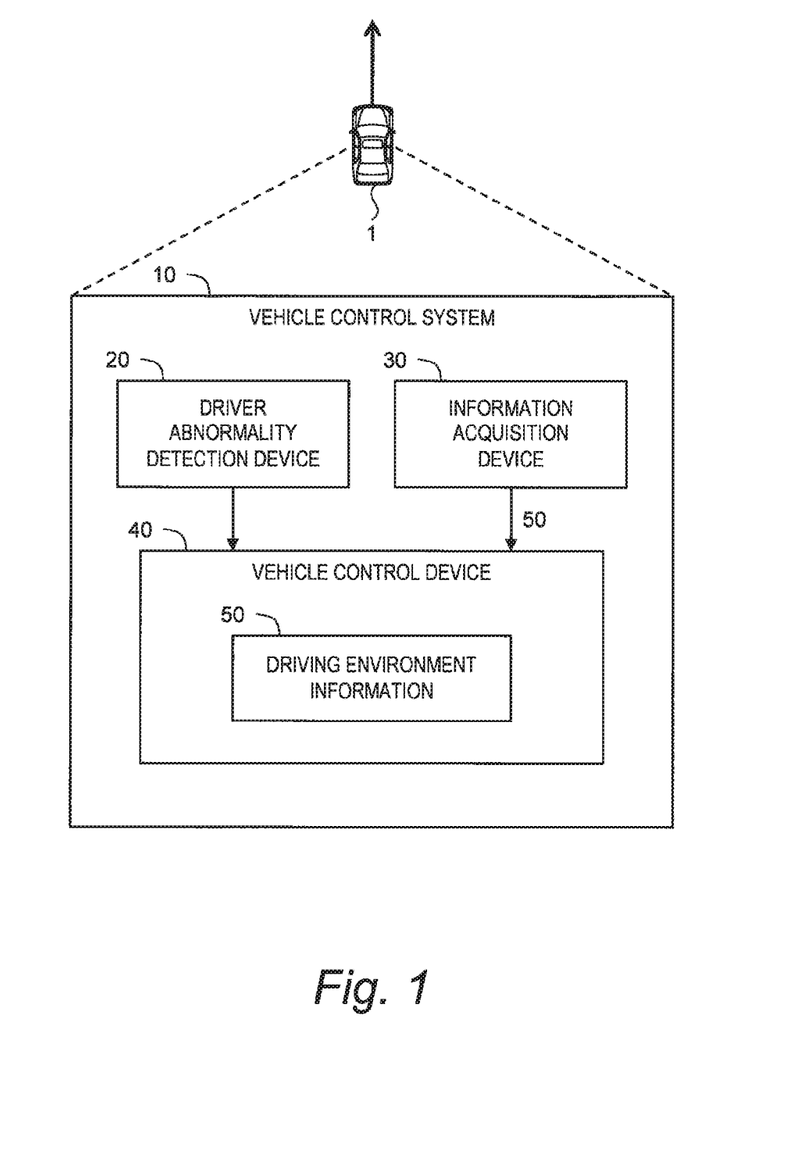
FIG. 1 is a block diagram schematically showing a vehicle control system according to an embodiment of the present disclosure.

FIG. 1 is a block diagram schematically showing a vehicle control system 10 according to the present embodiment. The vehicle control system 10 is installed on a vehicle 1 and controls the vehicle 1. More specifically, the vehicle control system 10 includes a driver abnormality detection device 20, an information acquisition device 30, and a vehicle control device 40.

The driver abnormality detection device 20 detects abnormality of a driver of the vehicle 1. The abnormality of the driver means that the driver is not in a state to be able to normally drive the vehicle 1. For example, the abnormality of the driver includes a state where the driver dozes off, a state where the driver's consciousness is decreased, and so forth. Typically, the driver abnormality detection device 20 determines whether or not the abnormality of the driver occurs while the vehicle 1 is traveling.

The information acquisition device 30 acquires driving environment information 50 indicating driving environment for the vehicle 1. The driving environment information 50 includes at least one of surrounding situation information indicating a situation around the vehicle 1, vehicle state information indicating a state of the vehicle 1, and driving operation information indicating a driving operation by the driver.

The vehicle control device 40 controls the vehicle 1. In particular, the vehicle control device 40 executes "emergency control" when the abnormality of the driver is detected by the driver abnormality detection device 20. The emergency control includes "vehicle stop control" and "abnormality notification processing."

The vehicle stop control is vehicle travel control for forcibly stopping the vehicle 1. The vehicle stop control includes deceleration control that decelerates the vehicle 1. In addition, the vehicle stop control may include steering control for making a lane change. For example, the vehicle stop control includes the deceleration control and the steering control for making the vehicle 1 stop at a safe position such as road shoulder.

The abnormality notification processing is processing of activating (actuating, turning on) a notification device in order to notify the outside of the vehicle 1 of the abnormality of the driver. The notification device is exemplified by a horn and hazard lights. Ringing the horn and blinking the hazard lights make it possible to alert people and surrounding vehicles around the vehicle 1.

The vehicle stop control is terminated when a stop control termination condition is satisfied. For example, the stop control termination condition is that the vehicle 1 completely stops. When detecting stop of the vehicle 1, the vehicle control device 40 terminates the vehicle stop control. As another example, the stop control termination condition is that a driving operation (an override operation) is performed by the driver during execution of the vehicle stop control. The driving operation is exemplified by an acceleration operation and a braking operation (deceleration operation). When detecting the driving operation by the driver during execution of the vehicle stop control, the vehicle control device 40 terminates the vehicle stop control.

How to terminate the abnormality notification processing has room for improvement. For example, unnecessarily continuing the abnormality notification processing even after termination of the vehicle stop control is annoying for an occupant in the vehicle 1 or people around the vehicle 1. On the other hand, terminating the abnormality notification processing together with the termination of the vehicle stop control may not be desirable depending on the situation.

In view of the above, the vehicle control device 40 according to the present embodiment determines, based on the driving environment information 50, whether to continue or terminate the abnormality notification processing after the termination of the vehicle stop control. The driving environment information 50 includes at least one of the surrounding, situation information indicating the situation around the vehicle 1, the vehicle state information indicating the state of the vehicle 1, and the driving operation information indicating the driving operation by the driver. Considering the driving environment information 50 makes it possible to flexibly continue or terminate the abnormality notification processing depending on the situation. This contributes to improvement of convenience of the vehicle control system 10.

Hereinafter, the vehicle control system 10 according to the present embodiment will be described in more detail.

2. CONFIGURATION EXAMPLE

2-1. Vehicle Control System 10

Figure 2:
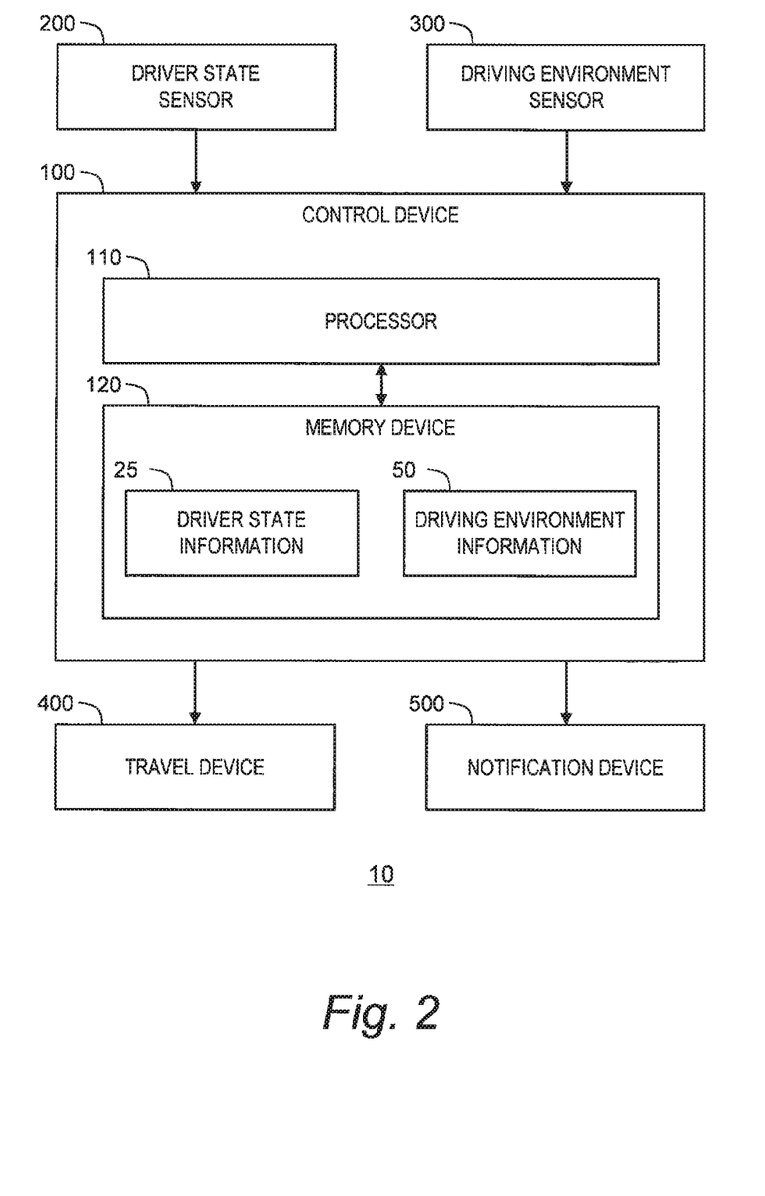
FIG. 2 is a block diagram showing a configuration example of the vehicle control system according to the embodiment of the present disclosure.

FIG. 2 is a block diagram showing a configuration example of the vehicle control system 10 according to the present embodiment. The vehicle control system 10 includes a control device 100, a driver state sensor 200, a driving environment sensor 300, a travel device 400, and a notification device 500.

The control device 100 is a controller that controls the vehicle 1. Typically, the control device 100 is a microcomputer provided with a processor 110 and a memory device 120. The control device 100 is also called an ECU (Electronic Control Unit). A variety of processing by the control device 100 is achieved by the processor 110 executing a control program stored in the memory device 120.

The driver state sensor 200 detects a state of the driver of the vehicle 1 to acquire driver state information 25 indicating the state of the driver. For example, the driver state sensor 200 includes a driver monitor, a steering wheel touch sensor, a biological information sensor, and so forth. The driver monitor includes an imaging device (e.g. an infrared camera) installed at a position where it can image a face of the driver. The driver monitor detects an orientation of the face, a direction of eyes, an eye opening/closing degree, and the like of the driver by analyzing an image obtained by the imaging device. The steering wheel touch sensor detects whether or not the driver is holing a steering wheel. The biological information sensor detects biological information such as a heart rate and a respiratory rate, and the like of the driver.

Figure 3:
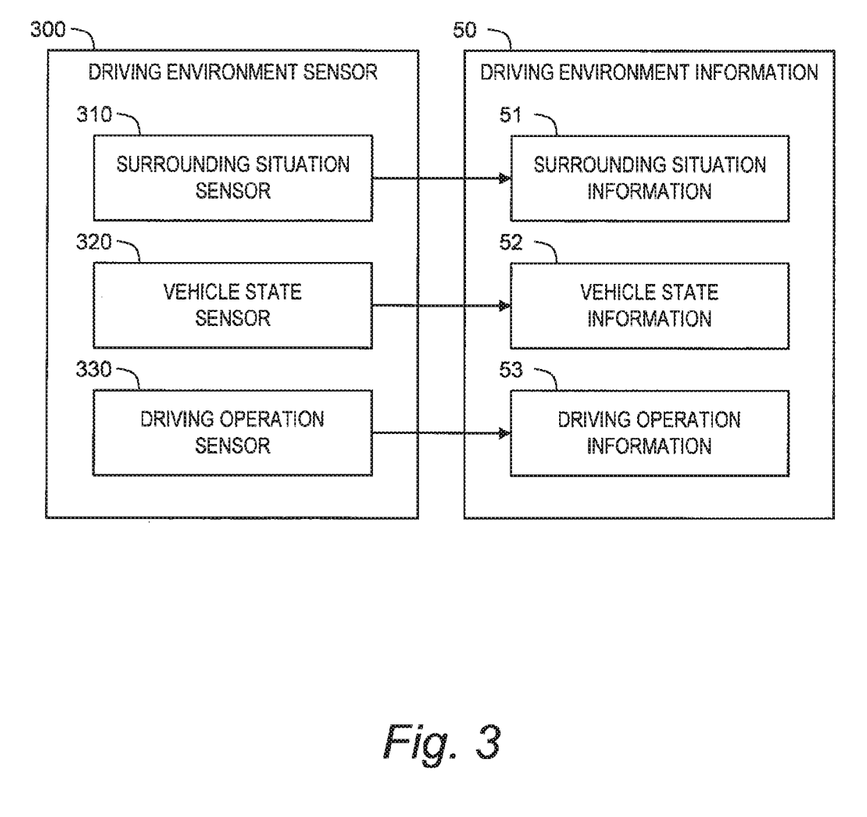
FIG. 3 is a block diagram showing an example of a driving environment sensor and driving environment information according to the embodiment of the present disclosure.

The driving environment sensor 300 acquires the driving environment information 50 indicating driving environment for the vehicle 1. FIG. 3 is a block diagram showing an example of the driving enviroment sensor 300 and the driving environment information 50 according to the present embodiment. The driving environment sensor 300 includes a surrounding situation sensor 310, a vehicle state sensor 320, and a driving operation sensor 330. The driving environment information 50 includes surrounding situation information 51, vehicle state information 52, and driving operation information 53.

The surrounding situation sensor 310 detects a situation around the vehicle 1 to acquire the surrounding situation information 51 indicating the situation around the vehicle 1. For example, the surrounding situation sensor 310 includes a least one of a camera, a LIDAR (Laser Imaging Detection and Ranging), and a radar. The surrounding situation information 51 includes at least one of image information indicating a result of imaging by the camera and measurement information indicating a result of measurement by the LIDAR and/or the radar. The control device 100 can recognize a target around the vehicle 1 based on the image information and/or the measurement information. The target around the vehicle 1 is exemplified by a surrounding vehicle, a white line, a roadside structure, a sign, and so forth. The surrounding situation information 51 may include information on the target around the vehicle 1, such as a relative position and a relative speed of the target.

The surrounding situation sensor 310 may further include an illuminance sensor, a rain sensor, and so forth. The illuminance sensor detects illuminance around the vehicle 1. The rain sensor detects raindrop. The surrounding situation information 51 may include the illuminance and a rainfall state.

The vehicle state sensor 320 detects a state of the vehicle 1 to acquire the vehicle state information 52 indicating the state of the vehicle 1. The stale of the vehicle 1 includes a speed of the vehicle 1 (i.e. a vehicle speed), an acceleration, a yaw rate, a steering angle, and so forth. The state of the vehicle 1 may include a door opening/closing operation and a door open-close state. The state of the vehicle 1 may include a battery level and a fuel level. The state of the vehicle 1 may include the number of occupants in the vehicle 1. For instance, the number of occupants in the vehicle 1 is detected by an in-vehicle camera. The state of the vehicle 1 may include a fault stale of each device of the vehicle 1.

The driving operation sensor 330 detects a driving operation by the driver to acquire the driving operation information 53 indicating the driving operation. The driving operation includes a steering operation, an acceleration operation, and a braking operation. For example, the driving operation sensor 330 includes a steering angle sensor, a torque sensor, an accelerator pedal sensor, and a brake sensor. The steering angle sensor detects a steering angle of a steering wheel. The torque sensor detects a steering torque. The accelerator pedal sensor detects a stroke amount of an accelerator pedal. The brake sensor detects a stroke amount of a brake pedal.

The travel device 400 includes a steering device, a driving device, and a braking device. The steering device turns wheels. The driving device is a power source that generates a driving force. The driving device is exemplified by an engine and an electric motor. The braking device generates a braking force.

The notification device 500 includes the horn and the hazard lights.

2-2. Driver Abnormality Detection Device 20

The control device 100 acquires the driver state information 25 from the driver state sensor 200. The driver state information 25 is stored in the memory device 120 of the control device 100. The control device 100 (i.e. the processor 110) detects abnormality of the driver based on the driver state information 25. Typically, the control device 100 determines whether or not the abnormality of the driver occurs while the vehicle 1 is traveling.

For example, the driver state Information 25 includes the orientation of the face, the direction of eyes, and the eye opening/closing degree of the driver. When the driver closes the eyes for more than a certain period of time, the control device 100 determines that the abnormality of the driver occurs. When a state where the driver does not face a front direction lasts for more than a certain period of time, the control device 100 determines that the abnormality of the driver occurs.

As another example, the driver state information 25 may include information on whether or not the driver holds the steering wheel. When the driver does not hold the steering wheel for more than a certain period of time, the control device 100 determines that the abnormality of the driver occurs.

As still another example, the driver state information 25 may include the biological information such as the heart rate and the respiratory rate of the driver. When the heart rate or the respiratory rate is less than a certain value, the control device 100 determines that the abnormality of the driver occurs.

It can be said that the driver state sensor 200 and the control device 100 constitute the "driver abnormality detection device 20" shown in FIG. 1.

2-3. Information Acquisition Device 30

As shown in FIG. 3, the driving environment sensor 300 acquires the driving environment information 50 indicating driving environment for the vehicle 1. The control device 100 (i.e. the processor 110) uses the driving environment sensor 300 to acquire the driving environment information 50. The driving environment information 50 is stored in the memory device 120 of the control device 100. It can be said that the driving environment sensor 300 and the control device 100 constitute the "information acquisition device 30" shown in FIG. 1.

2-4. Vehicle Control Device 40

The control device 100 (i.e. the processor 110) executes vehicle travel control that controls travel of the vehicle 1. The vehicle travel control includes acceleration control, deceleration control, and steering control. The control device 100 executes the acceleration control, the deceleration control, and the steering control by appropriately actuating the travel device 400 (i.e. the driving device, the braking device, and the steering, device).

Moreover, the control device 100 (i.e. the processor 110) executes the emergency control when the abnormality of the driver is detected by the driver abnormality detection device 20. The emergency control includes the vehicle stop control and the abnormality notification processing.

The vehicle stop control is the vehicle travel control for forcibly stopping the vehicle 1. The vehicle stop control includes the deceleration control that decelerates the vehicle 1. In addition, the vehicle stop control may include the steering control for making a lane change. For example, based on the surrounding situation information 51, the control device 100 determines a sale stop zone where the vehicle 1 can safely stop. Then, the control device 100 executes the vehicle stop control such that the vehicle 1 stops in the safe stop zone.

The abnormality notification processing is processing a activating (actuating, turning on) the notification device 500 in order to notify the outside of the vehicle 1 of the abnormality of the driver. Ringing the horn and blinking the hazard lights make it possible to alert people and surrounding vehicles around the vehicle 1.

It can be said that the travel device 400, the notification device 500, and the control device 100 constitute the "vehicle control device 40" shown in FIG. 1.

3. PROCESSING BY VEHICLE CONTROL SYSTEM

Figure 4:
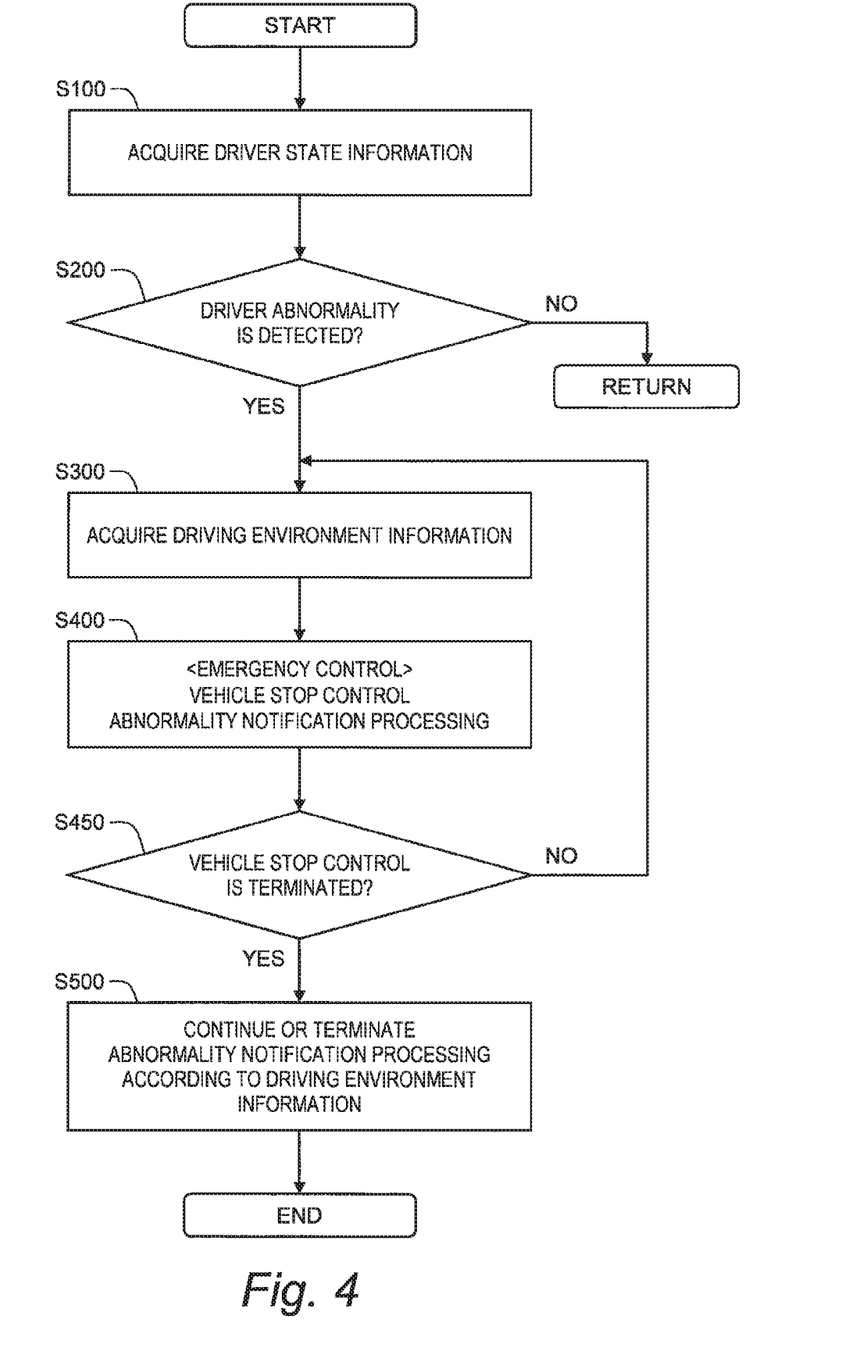
FIG. 4 is a flow chart showing processing by the vehicle control system according to the embodiment of the present disclosure.

FIG. 4 is a flow chart showing processing by the vehicle control system 10 according to the present embodiment.

In Step S100, the control device 100 (the driver abnormality detection device 20) acquires the driver state information 25.

In Step S200, the control device 100 (the driver abnormality detection device 20) determines, based on the driver state information 25, whether or not the abnormality of the driver occurs. When the abnormality of the driver does not occur (Step S200; No), the processing in the current cycle ends. On the other hand, when the abnormality of the driver occurs (Step S200; Yes), the processing proceeds to Step S300.

In Step S300, the control device 100 the information acquisition device 30 and the vehicle control device 40) acquires the driving environment information 50.

In Step S400, the control device 100 (the vehicle control device 40) executes the emergency control. The emergency control includes the vehicle stop control and the abnormality notification processing.

In Step S450, the control device 100 (the vehicle control device 40) determines whether or not the stop control termination condition is satisfied. For example, the stop control termination condition is that the vehicle 1 completely stops. The control device 100 can determine, based on the vehicle state information 52 (specifically, the vehicle speed), whether or not the stop control termination condition is satisfied.

As another example, the stop control termination condition is that a driving operation (an override operation) is performed by the driver during execution of the vehicle stop control. For instance, the stop control termination condition is that an acceleration operation or a braking operation is performed multiple times by the driver during execution of the vehicle stop control. The control device 100 can determine, based on the driving operation information 53, whether or not the stop control termination condition is satisfied.

When the stop control termination condition is not satisfied (Step S450; No), the processing returns back to the above-described Step S300. On the other hand, when the stop control termination condition is satisfied (Step S450;

Yes), the control device 100 terminates the vehicle stop control. After that, the processing proceeds to Step S500.

In Step S500, the control device 100 (the vehicle control device 40) flexibly determines whether to continue or terminate the abnormality notification processing, based on the driving environment information 50. In other words, the control device 100 switches continuation and termination of the abnormality notification processing according to the driving environment information 50. Various examples can be considered as Step S500. Hereinafter, various examples of Step S500 will be described.

4. VARIOUS EXAMPLES OF STEP S500

4-1. First Example

Figure 5:
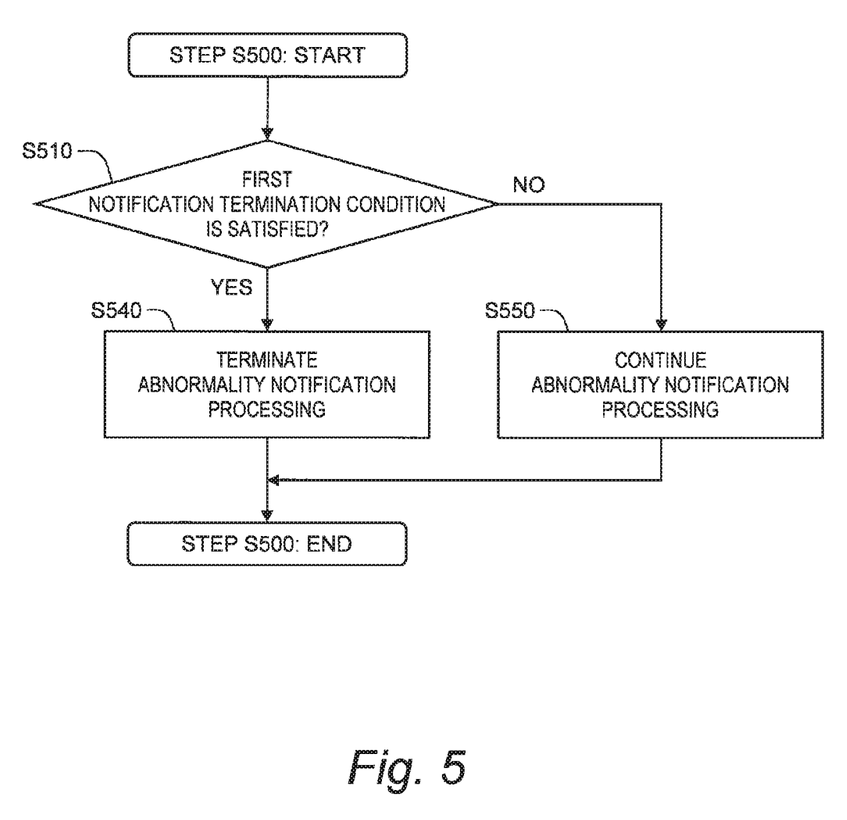
FIG. 5 is a flow chart showing a first example of Step S500 in FIG. 4.

FIG. 5 is a flow chart showing a first example of Step S500. In the first example, let us consider a "first notification termination condition." The first notification termination condition, which is an example of a condition for terminating the abnormality notification processing, is especially related to the situation around the vehicle 1. The control device 100 determines, based on the surrounding situation information 51, whether or not the first notification termination condition is satisfied (Step S510). When the first notification termination condition is satisfied (Step S510; Yes), the control device 100 terminates the abnormality notification processing (Step S540). On the other hand, when the first notification termination condition is not satisfied (Step S510; No), the control device 100 continues the abnormality notification processing (Step S550).

The first notification termination condition is set mainly from a viewpoint of whether safety is secured.

For example, in a situation where a surrounding vehicle may collide with the vehicle 1, some embodiments continue the abnormality notification processing even after the vehicle stop control is terminated. On the other hand, in another situation where a surrounding vehicle is unlikely to collide with the vehicle 1, some embodiments terminate the abnormality notification processing in order to reduce annoyance.

In view of the above, the first notification termination condition may include that "a relative speed of a surrounding vehicle with respect to the vehicle 1 is less than a threshold." The relative speed of the surrounding vehicle with respect to the vehicle 1 can be obtained from the surrounding situation information 51 (specifically, the target information). Particular attention may be given to the surrounding vehicle such as a preceding vehicle and a following vehicle that exist in the same lane as the vehicle 1.

From the same viewpoint, the first notification termination condition may include that "visibility around the vehicle 1 is equal to or higher than a threshold." A situation where the visibility is low is exemplified by night bad weather (rain, snow fog, etc.), and the like. For example, the illuminance detected by the illuminance sensor is used as the visibility. As another example, targets ahead of the vehicle 1 are detected based on the image information acquired by the camera, and a distance from the vehicle 1 to the farthest target may be used as the visibility. As still another example, the rainfall state detected by the rain sensor may be reflected in the visibility.

As another example, it can be said that safety is secured if rescue is performed at the vehicle 1. In that case, some embodiments terminate at least ringing of horn so as not to hamper the rescue operation. From this point of view, the first notification termination condition may include that "a rescue vehicle exists around the vehicle 1." The rescue vehicle can be recognized based on the surrounding situation information 51 (specifically, the image information acquired by the camera).

As described above, the first notification termination condition according to the first example is set mainly from the viewpoint of whether safety is secured. In a situation where safety is not secured, the first notification termination condition is not satisfied, and thus the abnormality notification processing continues. As a result, safety is increased. On the other hand, in another situation where safety is secured, the first notification termination condition is satisfied, and thus the abnormality notification processing is terminated. Since the abnormality notification processing does not continue unnecessarily, annoyance for an occupant in the vehicle 1 or people around the vehicle 1 is reduced.

4-2. Second Example

Figure 6:
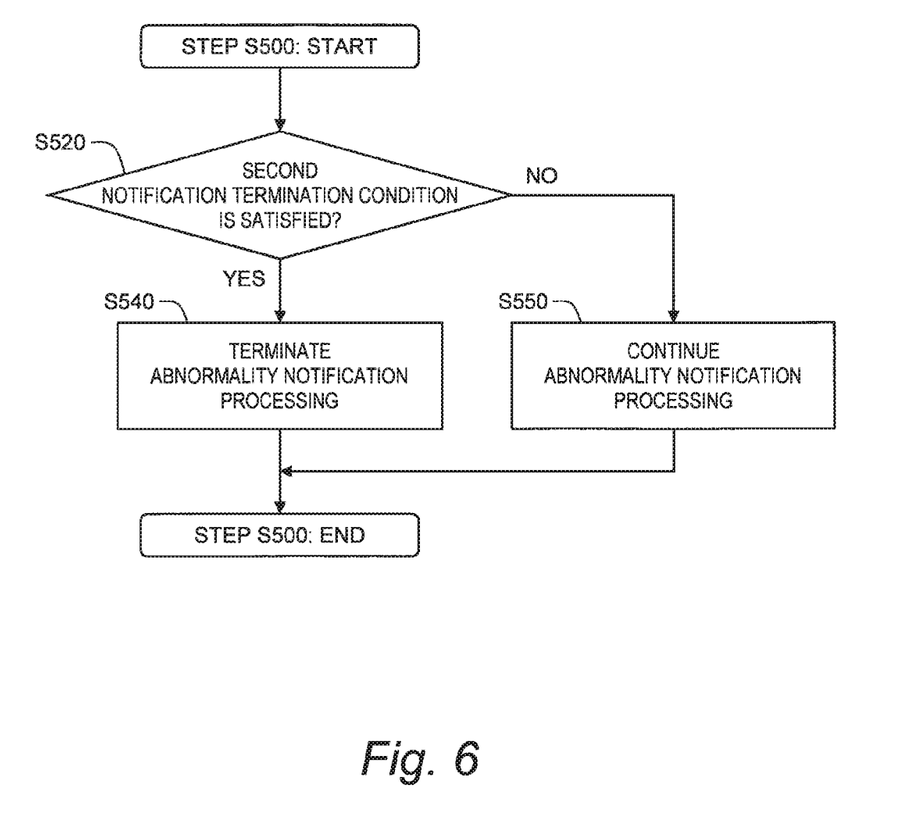
FIG. 6 is a flow chart showing a second example of Step S500 in FIG. 4.

FIG. 6 is a flow chart showing a second example of Step S500. In the second example, let us consider a "second notification termination condition." The second notification termination condition, which is an example of the condition for terminating the abnormality notification processing, is especially related to the state of the vehicle 1. The control device 100 determines, based on the vehicle state information 52, whether or not the second notification termination condition is satisfied (Step S520). When the second notification termination condition is satisfied (Step S520; Yes), the control device 100 terminates the abnormality notification processing (Step S540). On the other hand, when the second notification termination condition is not satisfied (Step S520; No), the control device 100 continues the abnormality notification processing (Step S550).

For example, when a door of the vehicle 1 is opened from the inside while the vehicle 1 is stopped, someone is likely to come out of the vehicle 1. Therefore, some embodiments continue the abnormality notification processing in order to secure safety of the person coming out of the vehicle 1. On the other hand, when a door of the vehicle 1 is opened from the outside while the vehicle 1 is stopped, it is likely that rescue is performed at the vehicle 1. In that case, some embodiments terminate at least ringing of horn so as not to hamper the rescue operation. From this point of view, the second notification termination condition may include that "a door of the vehicle 1 is opened from the outside while the vehicle 1 is stopped."

As another example, when an occupant other than the driver is present in the vehicle 1, the occupant is likely to make a rescue request and conduct a rescue operation. In that case, some embodiments terminate at least ringing of horn so as not to hamper the rescue request and the rescue operation. From this point of view, the second notification termination condition may include that "an occupant other than the driver is present in the vehicle 1."

As still another example, the second notification termination condition may include that "the battery level is less than a threshold." As still another example, the second notification termination condition may include that "the fuel level is less than a threshold." As still another example, the second notification termination condition may include that "the notification device 500 is broken."

As described above, the second notification termination condition according to the second example is set mainly from the viewpoint of the state of the vehicle 1. In some states of the vehicle 1, some embodiments terminate the abnormality notification processing. In that case, the second notification termination condition is satisfied, and thus the abnormality notification processing is terminated. Since the abnormality notification processing does not continue unnecessarily, annoyance for art occupant in the vehicle 1 or people around the vehicle 1 is reduced.

4-3. Third Example

In a third example, let us consider a case where the driving operation the override operation) is performed by the driver during execution of the vehicle stop control (Step S400). For example, the acceleration operation or the braking operation is performed multiple times by the driver during execution of the vehicle stop control. The control device 100 detects the driving operation by the driver based on the driving operation information 53 to terminate the vehicle stop control (Step S450; Yes).

In the subsequent Step S500, the control device 100 determines whether to continue or terminate the abnormality notification processing according to a "type" of the driving operation performed by the driver.

Figure 7:
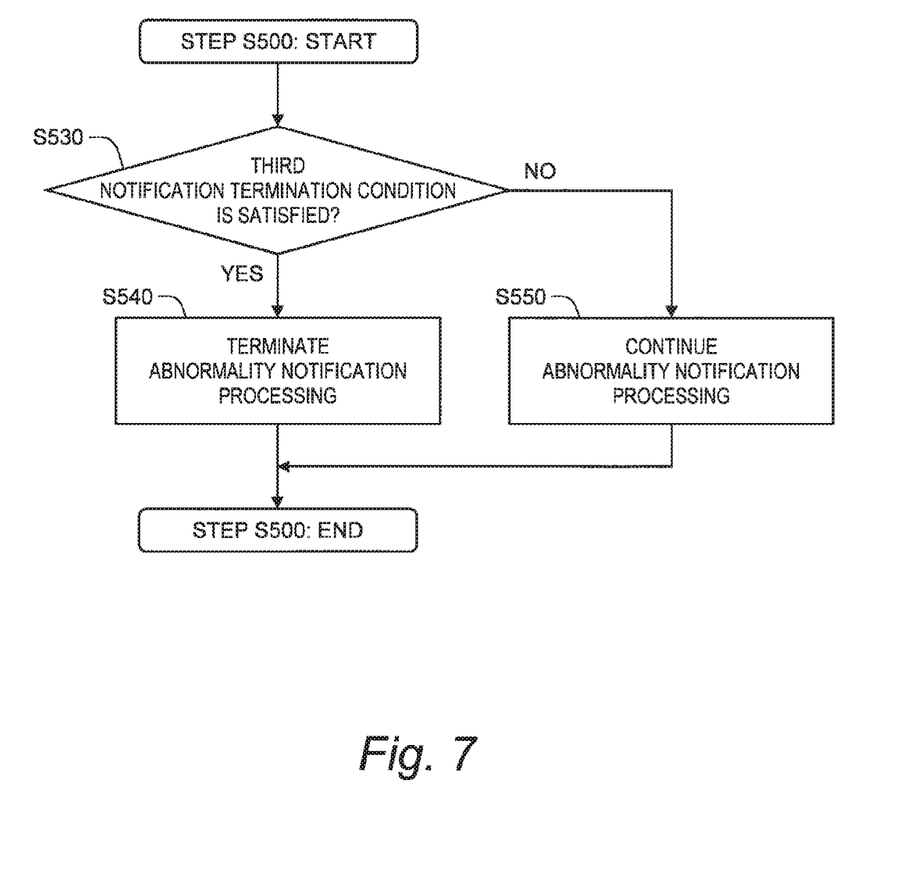
FIG. 7 is a flow chart showing a third example of Step S500 in FIG. 4.

For example, when the driving operation performed by the driver is the acceleration operation, the driver is considered to have an intention to continue driving of the vehicle 1. In that case, the abnormality notification processing gives senses of strangeness and anxiety to the driver and people around the vehicle 1, and interferes with the driving of the vehicle 1. This causes decrease in confidence in the vehicle control system 10. Therefore, some embodiments terminate the abnormality notification processing without continuing it.

On the other hand, when the driving operation performed by the driver is the braking operation, the driver is considered to have an intention to bring the vehicle 1 to an emergency stop. In that case, some embodiments continue the abnormality notification processing in order to alert people and surrounding vehicles around the vehicle 1.

FIG. 7 is a flow chart showing the third example of Step S500. A third notification termination condition, which is an example of the condition for terminating the abnormality notification processing, is especially related to the driving operation by the driver. The control device 100 determines, based on the driving operation information 53, whether or not the third notification termination condition is satisfied (Step S530). When the third notification termination condition is satisfied (Step S530; Yes), the control device 100 terminates the abnormality notification processing (Step S540). On the other hand, when the third notification termination condition is not satisfied (Step S530; No), the control device 100 continues the abnormality notification processing (Step S550).

From the above-described point of view, the third notification termination condition includes that "the acceleration operation is performed by the driver during execution of the vehicle stop control." When the acceleration operation is performed by the driver, the third notification termination condition is satisfied (Step S530; Yes), and the abnormality notification processing is terminated (Step S540). On the other hand, when the braking operation is performed by the driver, the third notification termination condition is not satisfied (Step S530; No), and the abnormality notification processing continues (Step S550).

As described above, according to the third example, the control device 100 determines whether to continue or terminate the abnormality notification processing according to the type of the driving operation performed by the driver during execution of the vehicle stop control. The driving operation performed by the driver during execution of the vehicle stop control reflects the driver's intention. It is therefore possible to appropriately determine whether to continue or terminate the abnormality notification processing, in accordance with the driver's intention. As a result, for example, the driver and people around the vehicle 1 are prevented from feeling the senses of strangeness and anxiety about the abnormality notification processing. This contributes to increase in confidence in the vehicle control system 10.

4-4. Fourth Example

Figure 8:
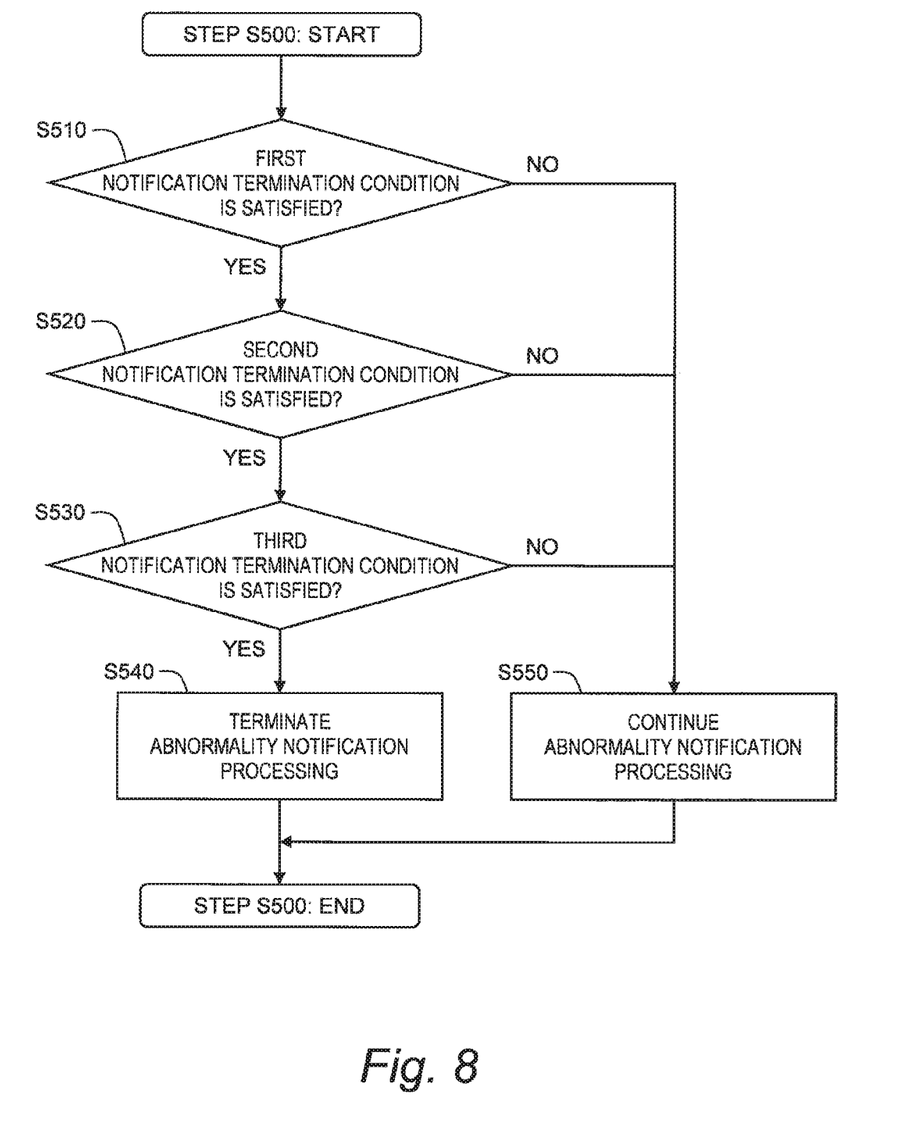
FIG. 8 is a flow chart showing a fourth example of Step S500 in FIG. 4.

It is also possible to combine two or more of the above-described first to third examples. In that case, the notification termination condition for terminating the abnormality notification processing is a combination of two or more of the first to third notification termination conditions.

FIG. 8 is a flow chart showing a fourth example of Step S500. In the example shown in FIG. 8, the notification termination condition is a combination of the first to third notification termination conditions. When at least one of the first to third notification termination conditions is not satisfied, the control device 100 continues the abnormality notification processing (Step S550). When all of the first to third notification termination conditions arc satisfied, the control device 100 terminates the abnormality notification processing (Step S540). As a result, it is possible to further appropriately continue or terminate the abnormality notification processing.

What is claimed is:

1. A vehicle control system installed on a vehicle and comprising:
    a driver abnormality detection device configured to detect abnormality of a driver of the vehicle;
    a vehicle control device configured to execute vehicle stop control that stops the vehicle and abnormality notification processing that activates a notification device, when the abnormality of the driver is detected, the notification device is configured to produce a notification outside of the vehicle; and
    an information acquisition device configured to acquire driving environment information including at least one of surrounding situation information indicating a situation around the vehicle, vehicle state information indicating a state of the vehicle, and driving operation information indicating a driving operation by the driver, wherein
    the vehicle control device is further configured to determine, based on the driving environment information, whether to continue or terminate the abnormality notification processing of the notification outside of the vehicle after termination of the vehicle stop control, which occurs when the vehicle is stopped or an override operation is performed by the driver,
    the driving environment information includes the driving operation information,
    when the driving operation is performed by the driver during execution of the vehicle stop control where the vehicle has not been completely stopped by the vehicle stop control, the vehicle control device terminates the vehicle stop control and determines whether to continue or terminate the abnormality notification processing of the notification outside of the vehicle according to a type of the driving operation, and when the driving operation is a braking operation, the vehicle control device continues the abnormality notification processing of the notification outside of the vehicle.

2. The vehicle control system according to claim 1, wherein
when the driving operation is an acceleration operation, the vehicle control device terminates the abnormality notification processing.

3. The vehicle control system according to claim 1, wherein
the driving environment information includes the surrounding situation information, the vehicle control device is further configured to:
determine, based on the surrounding situation information, whether or not a first notification termination condition related to the situation around the vehicle is satisfied;
terminate the abnormality notification processing when the first notification termination condition is satisfied; and
continue the abnormality notification processing when the first notification termination condition is not satisfied.

4. The vehicle control system according to claim 1, wherein the driving environment information includes the vehicle state information, the vehicle control device is further configured to:
determine, based on the vehicle state information, whether or not a second notification termination condition related to the state of the vehicle is satisfied;
terminate the abnormality notification processing when the second notification termination condition is satisfied; and
continue the abnormality notification processing when the second notification termination condition is not satisfied.

5. The vehicle control system according to claim 1, wherein
the driving environment information includes the surrounding situation information, the vehicle state information, and the driving operation information,
a notification termination condition for terminating the abnormality notification processing includes:
a first notification termination condition related to the situation around the vehicle;
a second notification termination condition related to the state of the vehicle; and
a third notification termination condition related to the driving operation by the driver,
the vehicle control device is further configured to:
determine, based on the driving environment information, whether or not the notification termination condition is satisfied;
continue the abnormality notification processing when at least one of the first notification termination condition, the second notification termination condition, and the third notification termination condition is not satisfied; and
terminate the abnormality notification processing when all of the first notification termination condition, the second notification termination condition, and the third notification termination condition are satisfied.

6. A vehicle control system installed on a vehicle and comprising:
a memory device in which driver state information indicating a state of a driver of the vehicle and driving environment information indicating driving environment for the vehicle are stored;
a processor; and
a notification device, wherein
the driving environment information includes at least one of surrounding situation information indicating a situation around the vehicle, vehicle state information indicating a state of the vehicle, and driving operation information indicating a driving operation by the driver,
the processor is configured to:
detect abnormality of the driver based on the driver state information;
execute vehicle stop control that stops the vehicle and abnormality notification processing that activates the notification device, when the abnormality of the driver is detected, the notification device is configured to produce a notification outside of the vehicle; and
determine, based on the driving environment information, whether to continue or terminate the abnormality notification processing of the notification outside of the vehicle after termination of the vehicle stop control, which occurs when the vehicle is stopped or an override operation is performed by the driver,
when the driving operation is performed by the driver during execution of the vehicle stop control where the vehicle has not been completely stopped by the vehicle stop control, terminate the vehicle stop control and determine whether to continue or terminate the abnormality notification processing of the notification outside of the vehicle according to a type of the driving operation, and
when the driving operation is a braking operation, continue the abnormality notification processing of the notification outside of the vehicle.

* * * * *